United States Patent [19]

Lindström

[11] Patent Number: 5,228,984
[45] Date of Patent: Jul. 20, 1993

[54] SYSTEM FOR COMPOSTING FECES AND TREATING URINE

[75] Inventor: Carl R. Lindström, Cambridge, Mass.

[73] Assignee: Clivus Multrum, Inc., Lawrence, Mass.

[21] Appl. No.: 624,861

[22] Filed: Dec. 10, 1990

[51] Int. Cl.$^5$ .............................................. C02F 3/04
[52] U.S. Cl. ...................................... 210/151; 210/170;
210/205; 210/251; 4/463; 4/DIG. 12
[58] Field of Search ...................... 210/602, 615–617,
210/150, 151, 205, 206, 170, 251; 4/449, 463,
DIG. 12, DIG. 19; 422/184

[56] References Cited

U.S. PATENT DOCUMENTS

| | | | |
|---|---|---|---|
| 3,136,608 | 6/1964 | Lindstrom | 23/259.1 |
| 3,238,124 | 3/1966 | Burton | 210/3 |
| 3,522,613 | 8/1970 | Botsford | 4/131 |
| 3,921,228 | 11/1975 | Sundberg | 4/131 |
| 4,001,108 | 1/1977 | Hellqvist | 210/617 |
| 4,084,269 | 4/1978 | Lindstrom | 4/111 |
| 4,087,869 | 5/1978 | Billsund | 4/111 |
| 4,107,795 | 8/1978 | Carter et al. | 4/313 |
| 4,163,294 | 8/1979 | Patterson | 4/111 |
| 4,196,477 | 4/1980 | Stewart | 4/111.1 |
| 4,209,390 | 6/1980 | Cabane et al. | 210/615 |
| 4,213,864 | 7/1980 | Asikainen | 210/151 |
| 4,254,515 | 3/1981 | Kiyama | 4/449 |
| 4,285,719 | 8/1981 | Criss | 210/602 |
| 4,501,665 | 2/1985 | Wilhelmson | 210/630 |
| 4,546,502 | 10/1985 | Lew | 4/449 |
| 4,608,175 | 8/1986 | Nuttle | 210/532.2 |
| 4,627,116 | 12/1986 | Shimizu | 4/111.6 |
| 4,997,568 | 5/1991 | Vandervelde et al. | 210/617 |

FOREIGN PATENT DOCUMENTS

| | | |
|---|---|---|
| 1256233 | 12/1967 | Fed. Rep. of Germany . |
| 2626093 | 12/1976 | Fed. Rep. of Germany . |
| 2415080 | 8/1979 | France . |
| 2003460 | 3/1979 | United Kingdom . |

*Primary Examiner*—Thomas Wyse
*Attorney, Agent, or Firm*—Hamilton, Brook, Smith & Reynolds

[57] ABSTRACT

A system and method is disclosed for composting feces and treating. Human feces is collected within a composting retainer and exposed to sufficient air and water to allow the feces to compost, thereby forming compost product. Urine is collected within an urine treatment retainer which is at least partially partitioned from the composting retainer and wherein the urine is passed through a substrate supporting aerobic nitrifying bacteria, thereby nitrifying a significant portion of the ammonium ions in the urine to form liquid product. The compost product is suitable for subsequent use, such as fertilizer or for use in forming a mixture with soil to form topsoil.

17 Claims, 3 Drawing Sheets

SYSTEM FOR COMPOSTING FECES AND TREATING URINE

BACKGROUND OF THE INVENTION

Disposal of human urine and feces has been difficult in remote, heavily trafficked areas. For example, many public restrooms in state and national parks cannot readily be connected to sewage treatment facilities and environmental considerations often effectively prevent use of septic systems. As an alternative to conventional municipal sewage treatment and septic systems, composting vessels have been employed to collect and treat feces and to collect urine from toilets at public restroom facilities where conditions are not otherwise suitable for the installation of waste-treatment facilities.

Collected feces and urine are allowed to remain in the composting vessel under conditions which allow them to decompose by a process known as composting. The compost formed from the feces and urine is then removed from the composting vessel. However, urine contains ammonium ions which can significantly inhibit the composting rate of feces. Often, a relatively high proportion of urine is collected in the composting vessel, thereby substantially reducing or terminating composting of the feces.

One attempt to reduce the concentration of ammonium ions in feces collected in a composting vessel includes draining urine and other liquid waste from feces collected in the composting vessel. Although liquid is separated from the collected feces, ammonium ions can accumulate in the composting feces, thereby decreasing the rate of composting. In addition, flow of a relatively large volume of liquid through collected feces can substantially diminish the rate of composting by reducing the amount of aeration in the collected wastes.

In another attempt, urine and feces are collected separately. However, separation of urine and feces causes the feces to dry, thereby inhibiting composting. Also, urine which is isolated from aeration and bacterial activity generally does not decompose. Water is often evaporated from the urine in isolated storage tanks in order to diminish the amount of storage volume required for urine which is stored separately. However, concentrated urine generates a strong disagreeable odor.

A need exists, therefore, for a new system and method for treating feces and urine which overcome or eliminate the aforementioned problems.

SUMMARY OF THE INVENTION

The present invention relates to a new system and method for composting feces and for treating urine.

A system for composting feces and for treating urine includes a composting retainer having a inlet for feces, an outlet for removing compost product from the composting retainer, means for directing the compost product to the outlet and a liquid passage, whereby liquid can be drained from the composting retainer through the liquid passage. Suitable means expose the feces within the composting retainer to sufficient air and water to allow the feces to compost, thereby forming a compost product. An urine treatment retainer is at least partially partitioned from the composting retainer and includes an inlet for urine, a substrate, aerobic nitrifying bacteria disposed on the substrate and a liquid product outlet, whereby urine is treated by the bacteria thereby forming a liquid product. A liquid storage vessel receives liquid product from the urine treatment retainer through the liquid-product outlet and receives liquid drained from the composting retainer through the liquid passage.

A method for composting feces and for treating urine includes the steps of collecting feces in a composting retainer and exposing the feces collected in the composting retainer to sufficient air and water to allow the feces to compost, thereby forming compost product. Urine is collected in a urine treatment retainer which is at least partially partitioned from the composting retainer. The urine collected in the urine treatment retainer is passed through a substrate supporting aerobic nitrifying bacteria disposed in the urine treatment retainer, whereby the urine is treated, thereby forming liquid product.

This invention has many advantages. In general, urea and nitrogen-containing urea derivatives are treated to form nitrite and nitrate salts. Odor generated by nitrogen-containing urea derivatives is thereby substantially reduced. In addition, urine is generally not combined with feces. Thus, the composting rate of feces is not significantly inhibited by excessive amounts of nitrogen which can accumulate in feces when feces and urine are collected together. Also, the volume of liquid within the composting feces is substantially reduced, thereby allowing a greater amount of aeration of the feces. The rate of composting of the feces can thereby be significantly increased. The amount of moisture in the feces can also be controlled to increase the rate of composting of collected feces. Further, the variability of the amount of moisture in the feces caused by differing use-patterns of the system can be significantly diminished because feces and urine are treated separately. Also, the diminished amount of ammonium ions present in the composting retainer allows employment of a wider variety of treatments to accelerate composting of the feces, such as introduction of earthworms. Compost product formed by the system and method of the invention is suitable for subsequent use, such as fertilizer or for use in forming a mixture with soil to form topsoil.

DETAILED DESCRIPTION OF THE INVENTION

The features and other details of the apparatus and method of the invention will now be more particularly described with reference to the accompanying drawings and pointed out in the claims. The same number present in different figures represents the same item. It will be understood that the particular embodiments of the invention are shown by way of illustration and not as limitations of the invention. The principle features of this invention can be employed in various embodiments without departing from the scope of the invention.

Figure 1:
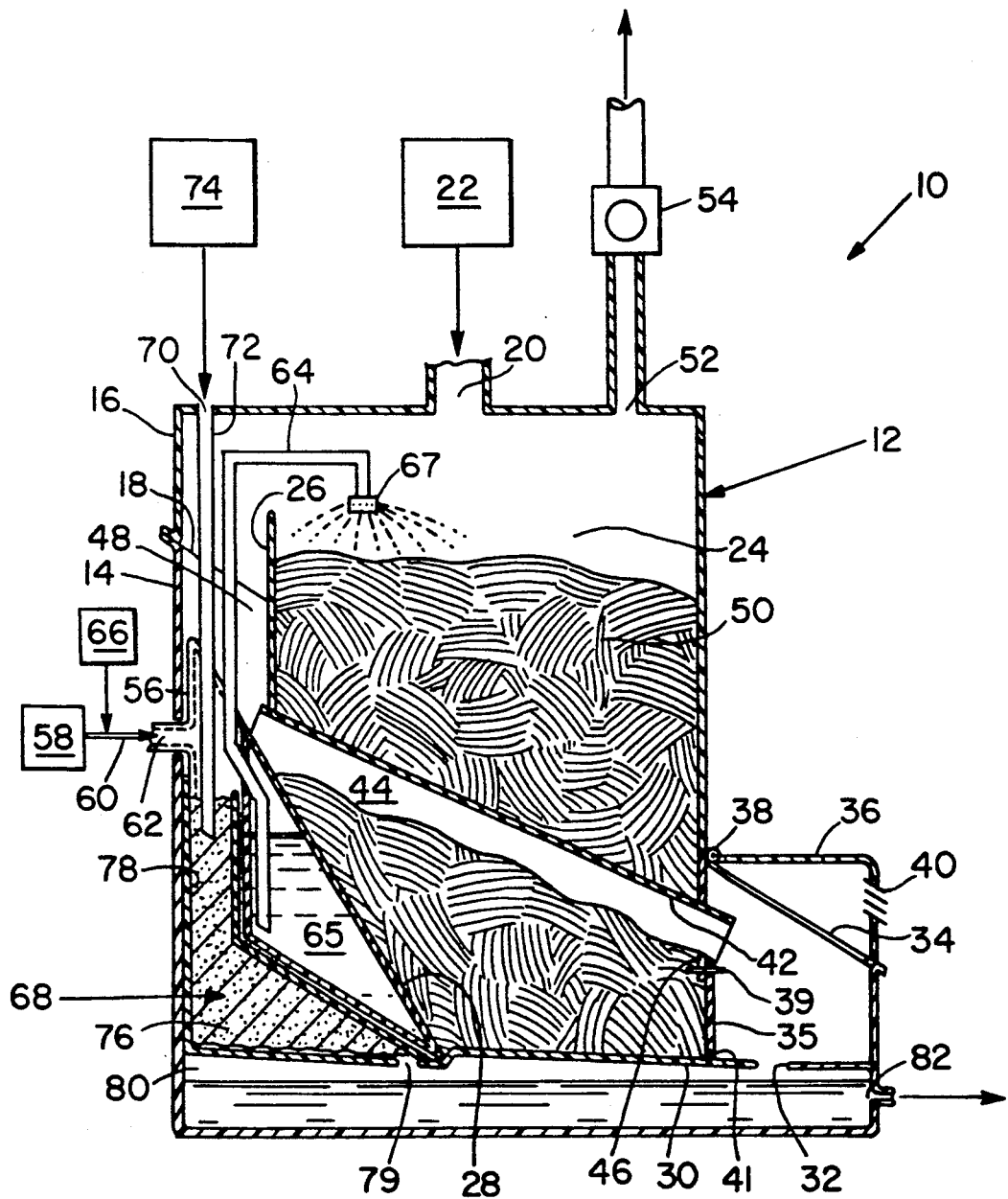
FIG. 1 is a section view of one embodiment of a system of the invention.

In one illustration of the invention, shown in FIG. 1, a treatment system 10 includes treatment vessel 12.

Treatment vessel 12 has a lower portion 14 and an upper portion 16. Lower portion 14 and upper portion 16 can be fixed together at seam 18 by suitable means, such as by bonding lower portion 14 to upper portion 16 at seam 18 with a suitable glue. Alternatively, lower portion 14 and upper portion 16 can be integral parts of a treatment vessel 12 which has no seam.

Upper portion 16 defines inlet 20. Inlet 20 is a conduit for conducting feces from feces source 22 to composting retainer 24 within treatment vessel 12. Inlet 20 can be fitted to a suitable receiving means, such as a toilet fixture, not shown.

Composting retainer 24 is defined by lower portion 14, upper portion 16, retaining wall 28 and by support 30, which partially defines liquid passage 32. Means for directing the compost product to outlet 34 include inclined wall 28. Inclined wall 28 is disposed at an angle to the horizontal sufficient direct compost product of compost bed 50 toward outlet 34 by gravitational force. Inclined wall 28 is also disposed at an angle sufficient to allow water collected with feces in composting retainer 24 to drain along inclined wall 28 to support 30. Preferably, inclined wall 28 is disposed at an angle to the horizontal greater than about 30°. In a particularly preferred embodiment, inclined wall 28 is disposed at an angle to the horizontal in the range of between about 45° and about 60°. Support 30 is slightly inclined to cause liquid collected at support 30 to drain through liquid passage 32.

Outlet 34 is also defined by lower portion 14 and upper portion 16. Outlet 34 is dimensioned and configured to allow access to composting retainer 24 for removal of compost product therefrom by a suitable means. Lid 36 is disposed at outlet 34. In a closed position, illustrated in FIG. 1, lid 36 covers outlet 34 for sealing composting retainer 24. Preferably, lid 36 is secured to treatment vessel 12 at upper portion 16 by hinge 38. Lid 36 can be opened by rotating lid 36 about hinge 38 to thereby enable access to compost product within composting retainer 24.

Hatch 35 is disposed at support 30. In the closed position, illustrated in FIG. 1, hatch 35 prevents compost product from spilling through liquid passage 32. Hatch 35 is secured in the closed position to retaining wall 37 by latch 39. By opening latch 39, hatch 35 can be rotated about hinge 41 from the closed position to an opened position, not shown, whereby liquid passage 32 is covered by hatch 35. Compost product can thereby be removed from treatment vessel 12 through outlet 34 without spilling the compost product through liquid passage 32. Hinge 41 is perforate to allow liquid to drain from compost bed 50 at support 30 to liquid passage 32.

Air inlet 40 is disposed at lid 36 for providing fluid communication of air from the atmosphere through air inlet 40 into treatment vessel 12. Air conduit 42 provides a path of air flow across composting retainer 24. Air conduit 40 comprises a deflection shield, whereby feces directed through inlet 20 is deflected from the space beneath air conduit 42, thereby forming air passage 44 as air conduit 42 is immersed in feces collected within composting retainer 24. Air conduit 42 is supported by retaining wall 26 and retaining wall 46. Retaining wall 46 is fixed to lower portion 14. Air passage 44 provides fluid communication between outlet 34 and air passage 48 defined by lower portion 14, upper portion 16 and retaining wall 26.

It is to be understood, however, that air conduit 42 can have other configurations suitable for conducting air across and/or through collected feces disposed in composting retainer 24. For example, air conduit 42 can be a perforate tube disposed at support 30 and inclined wall 28. In another example, a slotted grate is disposed at inclined wall 28 and support 30 to thereby form an air passage across and/or through collected feces in composting retainer 24. Slots in the grate allow air passing through the air passage to aerate the feces.

Human feces is directed from source 22 through inlet 20 into composting retainer 24 and collects within composting retainer 24. Feces which collect within composting retainer 24 form compost bed 50. Liquid collected in composting retainer 24 with the feces drains from compost bed 50 and is conducted along inclined wall 28 to support 30. Liquid at support 30 drains from composting retainer 24 through liquid passage 32.

Feces in compost bed 50 is exposed to conditions sufficient to allow the feces to compost, thereby treating the feces to form a compost product. "Composting," as that term is used herein, means decomposing of solid organic waste, such as human feces, to form compost product which is suitable for subsequent use, such as fertilizer or for use in forming a mixture with soil to form topsoil. Once initiated, composting of feces in compost bed 50 is continuous during exposure of compost bed 50 to conditions sufficient to maintain composting of the feces. Composting can be initiated spontaneously or can be initiated by combination of feces collected within composting retainer 24 with a suitable filler, such as wood shavings, to allow sufficient aeration and drainage of compost bed 50 to cause composting. It is in the nature of the composting process to substantially reduce the enteric bacteria content of the feces, typically by more than about ninety-nine percent, before removal of compost product from compost bed 50.

It is to be understood, however, that the invention can be used to compost, or decompose, various types of organic waste other than human feces. Examples of other kinds of organic waste suitable for composting by the system and method of the invention, either alone or in combination with collected feces, include discarded food, etc.

Compost retainer 24 has a volume sufficient to retain feces for composting in compost bed 50 for a period of time of about four years under the use-conditions of treatment system 10. Inclined wall 28 directs feces toward outlet 34 during composting of the feces and as additional feces collects on top of compost bed 50.

Air vent 52 is defined by upper portion 16 and provides fluid communication between air passage 48 and blower 54. Activation of blower 54 pulls air from the atmosphere through air inlet 40 into lower portion 14 and from lower portion 14 through air passages 44, 48 to upper portion 16. Air is directed across the top of compost bed 50 at upper portion 16 and is drawn from upper portion 16 through vent 52. The air is then discharged to the atmosphere through blower 54. Air is thereby directed from air inlet 40 through composting retainer 24 at a rate sufficient to allow at least a substantial portion of the feces in composting retainer 24 to compost. In a preferred embodiment, the rate of air flow through treatment system 10 is sufficient to draw air from the atmosphere into treatment vessel 12 through feces receiving means at inlet 20. Any odor generated by the feces collected within treatment vessel 12 can thereby be substantially prevented from escaping treatment system 10 except by discharge through blower 54.

The moisture content of compost bed 50 is maintained in a range which allows the feces to compost and thereby form compost product. Preferably, the moisture content in compost bed 50 is maintained in the range of between about sixty five percent and about eighty percent by weight. The moisture content of compost bed 50 can be maintained in a suitable range by intermittently adding water onto the top of compost bed 50. The moisture content in compost bed 50 can be determined by means known in the art.

The temperature of compost bed 50 is maintained in a range suitable for allowing the feces to compost and thereby form compost product. Preferably, the temperature of compost bed 50 is maintained in the range of between about 18° C. and about 40° C. The temperature of compost bed 50 can be maintained in a suitable range, such as by disposing treatment vessel 12 in a subterranean cavity which is perpetually at a temperature suitable for allowing the feces to compost. It is to be understood that other means can be employed to compost the feces, such as are known in the art. For example, earthworms can be introduced to compost bed 50 to establish a colony of earthworms which feed on the composting feces, thereby increasing the rate of composting in compost bed 50.

Water container 56 is disposed within treatment vessel 12. Inclined wall 28 is one wall of water container 56. Fresh water can be contained within water container 56 for distribution onto compost bed 50. Water can be directed from water source 58 through water conduit 60 and water inlet 62 for storage in water container 56. Water conduit 64 extends from water container 56 to composting retainer 24. Water can be directed from water container 56 through water conduit 64 by means known in the art. For example, water container 56 can be pressurized by directing air into water container 56 from air-pressure source 66. Alternatively, water can be pumped from water container 56 to compost bed 50 by a suitable pump, not shown, which is disposed at water conduit 64.

Water 65 is directed from water container 56 through water conduit 64 to compost bed 50 at a rate sufficient to maintain a moisture content in compost bed 50 sufficient to allow at least a substantial portion of the feces to compost. Preferably, water 65 is directed from water container 56 intermittently as is required to maintain continuous composting of feces in compost bed 50. Water 65 from water conduit 64 is sprayed by a suitable means 67 onto compost bed 50 for obtaining maximum distribution of moisture across compost bed 50. For example, water can be directed through a suitable nozzle disposed at water conduit 64, thereby providing a substantially even distribution of water across the top of compost bed 50. The moisture content of compost bed 50 can be monitored and controlled by automatic means, not shown, such as are known in the art, thereby automatically maintaining the level of moisture content within a range suitable for continuously composting the feces.

Urine treatment retainer 68 includes lower portion 14, support 30 and a wall of water container 56. Upper portion 16 defines inlet 70. Urine inlet 70 conducts urine from urine source 74 to urine conduit 72. Urine conduit 72 conducts urine from inlet 70 to urine treatment retainer 68. A suitable urine receiver can be fitted to inlet 70 for receiving urine from urine source 74. An example of a suitable urine receiver is a urinal, not shown. It is to be understood that urine suitable for collection in urine treatment retainer 68 includes, in addition to undiluted urine as excreted from a human, urine which has been diluted, for example, with greywater, such as flush water, and also urine which has been partially decomposed so that it includes nitrogen-containing urea derivatives, such as ammonium ions.

Substrate 76 is disposed within urine treatment retainer 68. Substrate 76 can be disposed within substrate container 78 to contain substrate 76 within urine treatment retainer 68 and to prevent uneven distribution, or channeling, of urine through substrate 76. Suitable substrates can support aerobic nitrifying bacteria, whereby at least a significant portion of ammonium ions in urine passed through substrate 76 will be nitrified by the aerobic nitrifying bacteria supported by substrate 76.

Suitable substrate 76 include substrates which can support aerobic nitrifying bacteria and which are relatively stable. Also, suitable substrates can maintain a sufficient moisture content and allow sufficient aeration to support aerobic nitrifying bacteria for nitrifying a significant portion of ammonium ions in the urine collected in urine treatment retainer 68. Examples of suitable substrates include loam, wood shavings and other cellulosic materials, etc. In a preferred embodiment, substrate 76 comprises peat moss.

The amount of aerobic nitrifying bacteria disposed in urine treatment retainer 68 is sufficient to nitrify a significant portion of ammonium ions in the collected urine under expected use-conditions of treatment system 10. Nitrification of the ammonium ions causes the ammonium ions to form, for example, nitrites and nitrates. Aerobic nitrifying bacteria can be introduced to substrate 76 by indigenous bacterial growth or by artificially introducing aerobic nitrifying bacteria into substrate 76. Examples of suitable aerobic nitrifying bacteria include Nitrobacter, Nitrosomonas, etc.

Urine from urine source 74 is directed through inlet 70 to urine treatment retainer retainer 68. Urine directed into treatment system 10 can be collected separately from feces by use of a separate urine receiving means, such as a urinal, or can be separated from feces by a suitable toilet fixture, such as are known in the art.

The urine passes through substrate 76 within urine treatment retainer 68. A significant portion of the ammonium ions in the urine within substrate 76 are nitrified to form nitrate and nitrites by the aerobic nitrifying bacteria supported by substrate 76. The urine is thereby treated within urine treatment retainer 68 to form liquid product. The liquid product drains from substrate 76 and aerobic nitrifying bacteria composition 68 through liquid-product outlet 79 defined by support 30 into liquid storage vessel 80.

It is to be understood that some urine can be collected in compost bed 50 along with feces. Urine collected in compost bed 50 and other liquid, such as greywater, decomposes in compost bed 50 by aerobic bacterial decomposition including, for example, composting.

Liquid storage vessel 80 includes lower portion 14 and support 30. Liquid product drains from urine treatment retainer 68 through liquid-product outlet 79 by gravitational force. Liquid storage vessel 80 also receives liquid which has drained from the feces in composting retainer 24. Liquid product from urine treatment retainer 68 combines with liquid from composting retainer 24 in liquid storage vessel 80. The rate of liquid flow through composting retainer 24 and through urine treatment retainer 68 are independent of each other in part because liquid storage vessel 80 does not affect the rate of liquid flow through either composting retainer 24 or urine treatment retainer 68.

The combined liquid product and liquid drained from compost bed 50 can be stored in liquid storage vessel 80 until liquid storage vessel 80 is substantially full. The liquid in liquid storage vessel 80 can be discharged through liquid storage vessel outlet 82 for direct release to a suitable area of the environment, e.g. onto soil where plants are growing. Liquid can be discharged from liquid storage vessel 80 by suitable means, such as by employing a pump, not shown. The amount of liquid stored in liquid storage vessel 80 can be regulated manually or by automated means, such as by using a liquid-level indicator means and an automatic liquid-level control means which are known in the art.

Treatment vessel 12, composting retainer 24, inclined wall 28 and support 30 can be formed of a suitable material, such as are known in the art. An example of suitable material is high-density cross-link polyethylene. Treatment vessel 12 is formed by a suitable method, such as by rotational molding. All other components of treatment system 10 can be formed of suitable materials, such as are known in the art.

Figure 2:
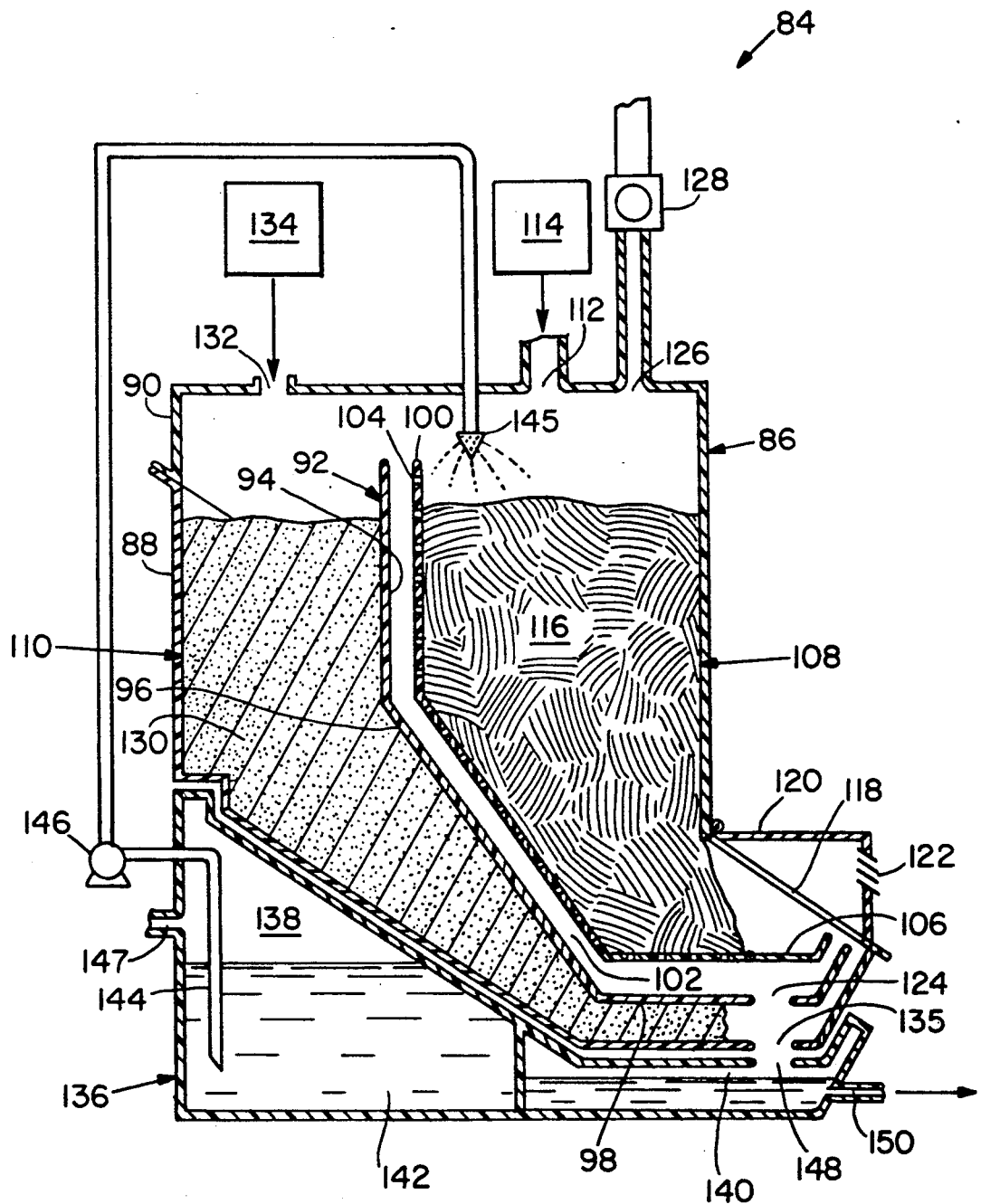
FIG. 2 is a section view of another embodiment of a system of the invention.

In another embodiment of the invention, illustrated in FIG. 2, treatment system 84 includes treatment vessel 86. Treatment vessel 86 can be a known composting treatment means, such as are disclosed in U.S. Pat. No. 3,136,608 and U.S. Pat. No. 4,084,269, the teachings of which are incorporated herein by reference. Treatment vessel 86 includes lower portion 88 and upper portion 90.

Partition 92 is disposed within treatment vessel 86 and includes vertical wall 94, inclined wall 96 and horizontal support 98. Perforate retaining wall 100 can be fixed to partition 92 at spacers, not shown. Perforate retaining wall 100 can be fixed to partition 92 at the spacers before insertion of partition 92 and perforate retaining wall 100 into treatment vessel 86. Air passage 102 is defined by partition 92 and perforate retaining wall 100. Perforations 104, defined by perforate retaining wall 100, are sufficiently large to allow air to pass across and/or through feces supported by perforate retaining wall 100 without allowing feces to pass through the perforations and block air passage 104. Perforate retaining wall 100 can include hinged panel 106 for obtaining access within treatment vessel 86.

Treatment vessel 86 is partitioned by partition 92 to form composting retainer 108 and urine treatment retainer 110. Compost retainer 108 is defined by partition 92 and treatment vessel 86. Upper portion 90 of treatment vessel 86 defines inlet 112 for receiving feces from feces source 114 into composting retainer 108. Feces collects within composting retainer 108 to form compost bed 116. Compost bed 116 is supported by retaining wall 100.

Compost bed 116 is conducted through composting retainer 108 by gravitational force toward outlet 118, which is defined by lower portion 88 and upper portion 90. Lid 120 is disposed at outlet 118 for shielding compost bed 116. Lid 120 defines air inlet 122 for providing fluid communication between the atmosphere and air passage 102. Liquid collected in composting retainer 108 with the feces can drain from compost bed 116 by passing through perforations 104 at retaining wall 100 and entering air passage 102. Liquid within air passage 102 is directed by gravitational force along inclined wall 96 to horizontal support 100 and drains from composting retainer 108 through liquid passage 124.

Compost bed 116 is exposed to sufficient air and moisture to allow at least a substantial portion of the collected feces in compost bed 116 to compost, thereby forming compost product. Air outlet 126 at upper portion 90 provides fluid communication between air passage 102 and blower 128. Activation of blower 128 directs air from the atmosphere through air inlet 122, air passage 102 and across the top of compost bed 116 to air outlet 126. The air is then directed through air outlet 126 and is discharged through blower 128 back to the atmosphere. Air is also directed across and/or through the feces at perforations 104 in retaining wall 100. Air is thereby directed through compost bed 116 at a rate sufficient to allow the feces in compost bed 116 to compost.

Solid substrate 130 is disposed in urine treatment retainer 110 for receiving urine. Urine inlet 132 is defined by upper portion 90 and provides fluid communication between urine source 134 and urine treatment retainer 110. Urine is directed from urine source 134 through inlet 132 and collects within urine treatment retainer 110.

The collected urine passes through substrate 130 by gravitational force, whereby at least a significant portion of ammonium ions in the urine is nitrified by nitrifying bacteria supported by substrate 130. The urine is thereby treated to form liquid product. The liquid product drains from substrate 130 within urine treatment retainer 110 and through liquid-product outlet 135.

Treatment vessel 86 is disposed on cradle 136. Cradle 136 defines water chamber 138 and liquid storage chamber 140. Fresh water 142 is disposed within water chamber 138. Fresh water 142 is directed from water chamber 138 through water conduit 144 and nozzle 145 onto the top of compost bed 116 by a suitable means, such as by activating pump 146 disposed at water conduit 144. Water chamber 138 is refilled by directing water through water chamber inlet 147 into water chamber 138. The moisture content of compost bed 116 is thereby maintained at an amount sufficient to allow feces in compost bed 116 to compost.

Liquid storage inlet 148, defined by cradle 136 at liquid storage chamber 140, provides fluid communication between liquid-product outlet 135 of treatment vessel 86 and liquid storage chamber 140. Liquid drained from compost bed 116 in urine treatment retainer 110 passes through liquid passage 120, liquid-product outlet 135 and liquid storage inlet 148 into liquid storage chamber 140. Treated liquid product drained from substrate 130 in urine treatment retainer 110 passes through liquid-product outlet 135 and liquid storage inlet 148 into liquid storage chamber 140. Liquid from composting retainer 108 and urine treatment retainer 110 combine in liquid storage chamber 140. The combined liquids are stored in liquid storage chamber 140 and then periodically discharged from treatment system 84 through liquid storage outlet 150.

Treatment vessel 86 and cradle 136 are formed of a suitable material. An example of a suitable material is high-density cross-link polyethylene.

Figure 3:
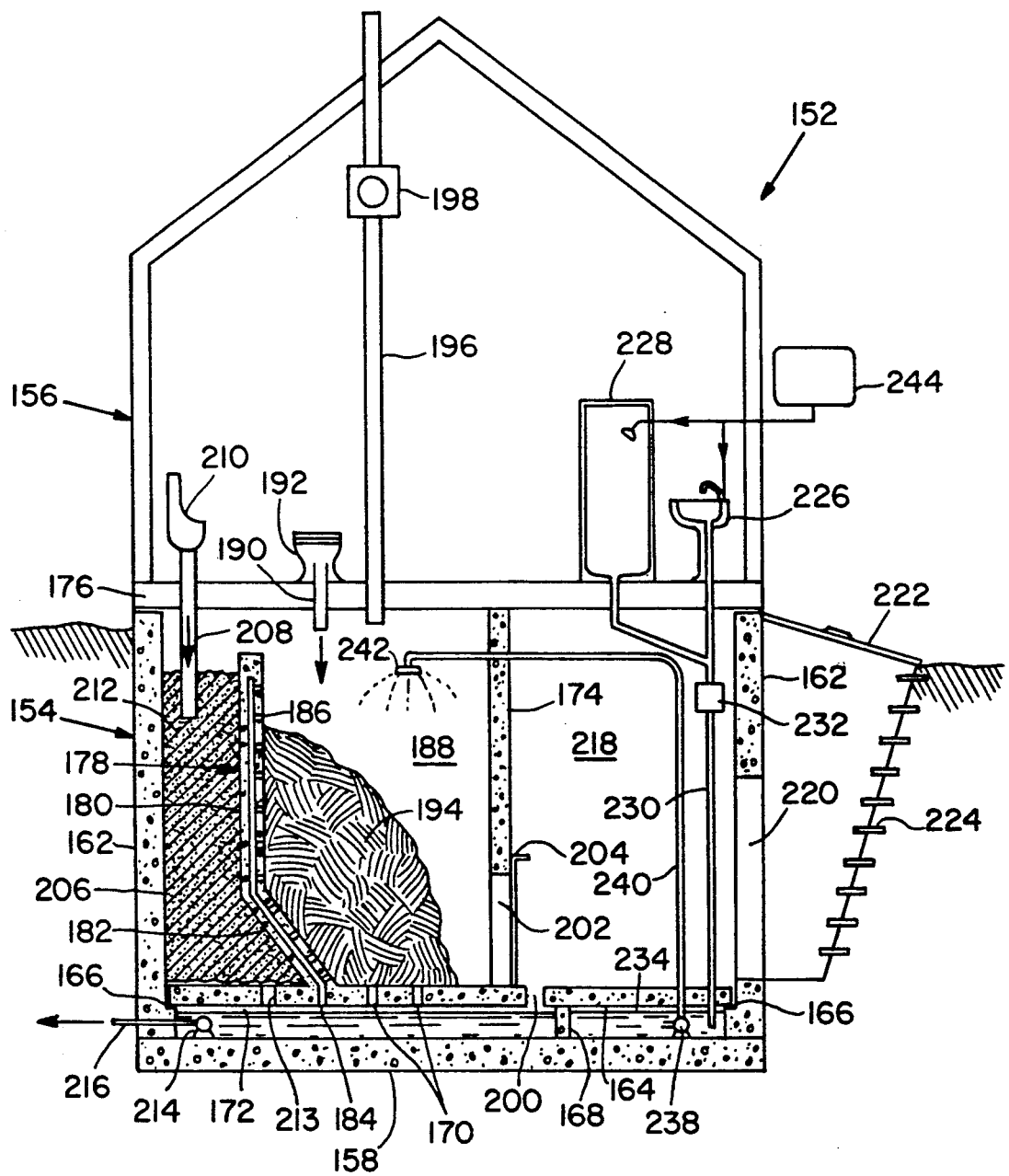
FIG. 3 is a section view of still another embodiment of a system of the invention, including a building foundation and a building structure disposed on the building foundation.

In still another embodiment of the invention shown in FIG. 3, treatment system 152 includes building foundation 154 and building structure 156 disposed on building foundation 154.

Building foundation 154 includes foundation floor 158 disposed within a subterranean cavity and foundation walls 162 which are disposed substantially vertically at the perimeter of foundation floor 158 and are fixed to foundation floor 158. Building foundation 154 has sufficient strength to contain liquids and solids collected within building foundation 154 and to support building structure 156 disposed on building foundation 154.

Raised support 164 is disposed substantially horizontally between foundation walls 162 and is elevated above foundation floor 158. Raised support 164 can be supported above foundation floor 158 by foundation walls 162 at lip 166 and by spacer 168 disposed between foundation floor 158 and raised support 164. Raised support 164 has liquid passages 170 for allowing liquid collected at raised support 164 to pass through liquid passages 170. Liquid passing through liquid passages 170 collects within liquid storage vessel 172, which is integral with foundation floor 158, foundation walls 162 and raised support 164.

Interior wall 174 is disposed substantially vertically between raised support 164 and building structure floor 176. Building structure floor 176 is supported by foundation walls 162. Interior wall 174 can be formed of a material, such as concrete, which has sufficient strength to provide additional support for building structure floor 176.

Partition 178 includes vertical wall 180 and inclined wall 182. Partition 178 is disposed on raised support 164 and is supported between foundation walls 162. Air passage 184 extends through perforate support and partition 178 and provides fluid communication between liquid storage vessel 172 and air-outlet ports 186.

Compost retainer 188 is integral with partition 178, vertical wall 180, foundation walls 162 and vertical wall 180. Inlet 190 is defined by building structure floor 176 and conducts feces from feces receiver 192 to composting retainer 188. Feces is received through inlet 190 at feces receiver 192 and collects within composting retainer 188 to form compost bed 194.

Liquid waste collected with the feces in composting retainer 188 drains from composting retainer 188 by gravitational force and collects at inclined wall 182 and raised support 164. Liquid waste at inclined wall 182 is conducted by inclined wall 182 to raised support 164. Liquid waste collected at raised support 164 drains through liquid passages 170 and collects within liquid storage vessel 172.

Compost bed 194 is exposed to conditions sufficient to allow at least a substantial portion of the feces in compost bed 194 to compost, thereby forming compost product. Air vent 196 provides fluid communication between the interior of building foundation 154 and blower 198. Activation of blower 198 directs air through vent 200 in raised support into liquid storage vessel 172. The air is then directed through air passage 184 and air-outlet ports 186 to air vent 196, thereby causing air to pass across and/or through compost bed 194 at a rate sufficient to allow the feces in compost bed 194 to compost. The air directed through and/or across compost bed 184 is then directed through a air vent 196 to blower 198. Blower 198 discharges the air to the atmosphere. Blower 198 can be of a sufficient size to cause air to be directed through feces receiver 192 and inlet 190 into composting retainer 188 to prevent odor, generated by compost bed 194, from being discharged into building structure 156.

As the collected feces composts in compost bed 194, it is directed by inclined wall 182 toward outlet 202 at interior wall 174. Sliding door 204 can be raised to provide access to compost product in compost bed 194. Compost product can thereby be removed from composting retainer 188 for further processing or release to the environment.

Urine treatment retainer 206 is integral with three foundation walls 162, raised support 164 and partition 178. Inlet 208 conducts urine from a urine receiver 210, such as a urinal, to urine treatment retainer 206. Urine is received in urine treatment retainer 210 and is directed from urine receiver 210 through inlet 208 into urine treatment retainer 206. Solid support 212 is disposed within urine treatment retainer 206 for receiving urine from inlet 208. Urine collects within substrate 212 and passes through substrate 212 by gravitational force. At least a significant portion of the ammonium ions in the collected urine are nitrifed by aerobic nitrifying bacteria supported by substrate 212, thereby treating the urine to form liquid product. Liquid product drains from substrate 212 and collects at raised support 164. The liquid product then passes through liquid product outlet 213 at raised support 164 and collects within liquid-storage vessel 172.

Liquid product and liquid drained from compost bed 194 are combined in liquid-storage vessel 172. The liquid in liquid-storage vessel 172 can be periodically discharged from liquid-storage vessel 172 by submersible pump 214 disposed in liquid-storage vessel 172. The liquid is pumped by submersible pump 214 from liquid-storage chamber 172 through liquid-storage vessel outlet 216 for further processing or discharge to the environment.

Access chamber 218 is defined by raised support 164, interior wall 174, building structure floor 176 and a building foundation wall 162 which defines access chamber entryway 220. Access chamber 218 provides access to outlet 202 and sliding door 204 for removing compost product from compost bed 194. Bulkhead 222 and stairs 224 provide access to access-chamber entryway 220.

Building structure 156 provides shelter for feces receiver 192 and urine receiver 210. Also, receivers for greywater, such as sink 226 and shower 228, can be disposed within building structure 156. Greywater from sink 226 and shower 228 are directed through greywater conduit 230 to greywater filter 232 by gravitational force.

Filtered greywater is collected from greywater filter 232 and stored in greywater-storage vessel 234, which is integral with foundation floor 158, foundation walls 162, perforate support 164 and spacer 168. Stored greywater 236 is pumped from greywater-storage vessel 234 by submersible pump 238, disposed in greywater-storage vessel 234, through greywater conduit 240. Greywater conduit 240 conducts greywater from greywater-storage vessel 234 to compost bed 194. Nozzle 242 at greywater conduit 240 distributes greywater discharged from greywater conduit 240 substantially evenly over compost bed 194. Greywater is pumped from greywater-storage vessel 234 to compost bed 194 to maintain a moisture content in compost bed 194 which is sufficient to allow at least a substantial portion of the collected faces in compost bed 194 to compost.

Water is supplied to building structure 156 for sink 226 and a shower 228 from a suitable water source 244, such as a water storage tank or a local reservoir.

It is to be understood that a treatment system of the invention can be constructed without a partition, whereby feces and urine are collected together in a single treatment vessel, not shown, integral with building foundation walls and raised support. Urine collected with the feces in the treatment vessel drains from the feces and through apertures in the raised support into a liquid-storage vessel integral with a building foundation floor, at least two of the building foundation walls and the raised support.

Equivalents

Those skilled in the art will recognize, or be able to ascertain using no more than routine experimentation, many equivalents to specific embodiments of the invention described specifically herein. Such equivalents are intended to be encompassed in the scope of the following claims.

I claim:

1. A system for composting feces and for treating urine to produce treated products, comprising:
   a) a composting retainer including an inlet for receiving feces, an outlet for removing compost product from the retainer, means for directing the compost to the outlet and a liquid passage, whereby liquid can be drained from the composting retainer through the liquid passage;
   b) a freshwater vessel for containing fresh water;
   c) means for directing fresh water from the freshwater vessel to the composting retainer for moistening the feces in an amount sufficient to allow the collected feces to compost, thereby forming a compost product;
   d) a urine treatment retainer which is partitioned from the composting retainer, including an inlet for urine, a substrate, aerobic nitrifying bacteria disposed on the substrate and a liquid product outlet, whereby urine directed into the retainer is treated by the bacteria, thereby forming a liquid product which can be drained from urine treatment retainer through the liquid product outlet; and
   e) a liquid storage vessel for receiving liquid product from the urine treatment retainer through the liquid-product outlet and for receiving liquid drained from the composting retainer through the liquid passage.

2. A system of claim 1 wherein the composting retainer defines a chamber having a major axis which is oriented substantially vertically.

3. A system of claim 2 further including means for directing composting feces within the composting retainer to the outlet.

4. A system of claim 3 wherein the means for directing the compost to the outlet include an inclined panel disposed at an angle to the horizontal greater than about 30°.

5. A system of claim 4 wherein the water vessel is disposed between the urine treatment retainer and the composting retainer.

6. A system of claim 5 wherein the urine treatment retainer, the fresh water vessel and the composting retainer are comprised of high-density polyethylene.

7. A system of claim 1 wherein the composting retainer, the urine treatment retainer and the liquid-storage vessel are integral with a building foundation.

8. A system of claim 7 further including a building structure disposed on the building foundation.

9. A system of claim 8 further including earthworms disposed in the composting retainer for composting the feces within the composting retainer.

10. A system for composting feces and for treating urine, comprising:
    a) a cradle for supporting a treatment vessel;
    b) a fresh-water vessel disposed within the cradle for containing fresh water;
    c) means for directing fresh water from the fresh-water vessel to the treatment vessel for moistening feces collected in the treatment vessel in an amount sufficient to allow the collected feces to compost, thereby forming compost product;
    d) means disposed in the cradle for storing liquid drained from the moistened feces collected in the treatment vessel;
    e) a partition for disposition within the treatment vessel, whereby separation is substantially maintained between the composting feces and urine collected within the treatment vessel;
    f) means for causing liquid to drain from the moistened feces into the means disposed in the cradle for storing liquid; and
    g) means disposed at the partition for allowing air to be directed across the collected feces at a rate sufficient to allow the feces to compost, thereby forming compost product.

11. A system of claim 10 further including a solid support for supporting aerobic nitrifying bacteria, whereby urine collected within the treatment vessel passes through the solid support, thereby treating the urine to form liquid product.

12. A system for composting feces and for treating urine, comprising:
    a) a building foundation including a building foundation floor and building foundation walls fixed to the building foundation floor for supporting a building disposed on the building foundation;
    b) a raised support disposed substantially horizontally between the foundation walls and elevated above the building foundation floor, a liquid storage vessel being integral with the building foundation floor, the raised support and at least two building foundation walls;
    c) a building structure disposed on the building foundation including a building structure floor defining an inlet for conducting feces from a source of feces to a treatment vessel being integral with at least two building foundation walls, the raised support and the building foundation floor;
    d) means for draining liquid collected with the feces in the treatment vessel from the feces and into the liquid storage vessel;
    e) a fresh-water vessel for containing fresh water; and
    f) means for directing fresh water from the freshwater vessel to the treatment vessel for moistening the feces in an amount sufficient to allow the collected feces to compost, thereby forming a compost product.

13. A system of claim 12 further including a partition disposed between the building foundation walls, whereby a composting retainer for receiving feces from the inlet is integral with the partition, the raised support and at least two of the building foundation walls, and whereby a urine treatment retainer is integral with the partition, the raised support and at least two of the building foundation walls for receiving urine from a urine source through the inlet for treatment of the urine to form a liquid product which is then directed from the urine treatment retainer to the liquid storage vessel.

14. A system of claim 13 further including a substrate disposed within the urine treatment retainer and aerobic nitrifying bacteria supported by the substrate, whereby the collected urine can pass through the substrate, thereby treating the urine to form liquid product.

15. A system of claim 14 wherein the composting retainer defines a chamber having a major axis which is oriented substantially vertically.

16. A system of claim 15 further comprising a greywater storage vessel integral with the building foundation for collecting and storing greywater generated in the building structure and in the building foundation.

17. A system of claim 16 further including means for directing greywater from the greywater storage vessel to the composting vessel.

* * * * *